(12) United States Patent
Hawes et al.

(10) Patent No.: US 7,144,635 B2
(45) Date of Patent: Dec. 5, 2006

(54) TEAR RESISTANT HEAT SEALABLE PACKAGING STRUCTURE

(75) Inventors: David H. Hawes, Clifton Forge, VA (US); Mohan Sasthav, Elkridge, MD (US)

(73) Assignee: MeadWestvaco Corporation, Glen Allen, VA (US)

( * ) Notice: Subject to any disclaimer, the term of this patent is extended or adjusted under 35 U.S.C. 154(b) by 9 days.

(21) Appl. No.: 09/951,035

(22) Filed: Sep. 13, 2001

(65) Prior Publication Data

US 2003/0091847 A1 May 15, 2003

(51) Int. Cl.
*B32B 27/10* (2006.01)

(52) U.S. Cl. ............... 428/510; 428/483; 428/511; 428/520

(58) Field of Classification Search ............. 428/510, 428/511, 483, 520; 53/477
See application file for complete search history.

(56) References Cited

U.S. PATENT DOCUMENTS

| | | |
|---|---|---|
| 4,950,510 A | 8/1990 | Massouda |
| 4,957,578 A | 9/1990 | Huffman et al. |
| 5,091,261 A | 2/1992 | Casey et al. |
| 5,116,649 A * | 5/1992 | Massouda ............... 428/34.2 |
| 5,690,775 A | 11/1997 | Calvert et al. |
| 5,792,301 A | 8/1998 | Calvert et al. |
| 5,888,714 A * | 3/1999 | Bourdelais et al. ......... 430/536 |
| 5,935,664 A | 8/1999 | Claytor et al. |
| 6,010,784 A | 1/2000 | Peterson |
| 6,047,829 A | 4/2000 | Johnstone et al. |
| 6,080,456 A * | 6/2000 | Fonteyne ................. 428/35.7 |
| 6,087,079 A * | 7/2000 | Newberry et al. ......... 430/510 |
| 6,245,395 B1 * | 6/2001 | Falat et al. ............... 427/557 |
| 6,264,098 B1 * | 7/2001 | Drummond et al. ..... 229/123.1 |
| 6,412,636 B1 * | 7/2002 | Jones et al. .............. 206/532 |
| 6,436,547 B1 * | 8/2002 | Toft et al. ................ 428/474.4 |
| 6,479,137 B1 * | 11/2002 | Joyner et al. ............ 428/212 |
| 6,752,272 B1 * | 6/2004 | Jones et al. .............. 206/534 |
| 2002/0050119 A1 * | 5/2002 | Gatewood et al. ........... 53/396 |

FOREIGN PATENT DOCUMENTS

| | | | |
|---|---|---|---|
| JP | 2003-13094 | * | 11/2000 |
| WO | WO 99/50066 | * | 9/1999 |

* cited by examiner

*Primary Examiner*—D. Lawrence Tarazano
(74) *Attorney, Agent, or Firm*—Thompson Hine, LLP

(57) ABSTRACT

A tear resistant laminated comprised of a paper or paperboard substrate, and adhesive layer, a tear resistant layer secured to the adhesive layer, and a heat-sealable material. The tear resistant material has a a tear strength as measured by the Elmendorf tear propagation test of at least about 300 grams of force in both machine and cross direction.

9 Claims, 4 Drawing Sheets

Heat Sealant Layer

TEAR RESISTANT LAYER

ADHESIVE LAYER

PAPER SUBSTRATE

TEAR RESISTANT HEAT SEALABLE PACKAGING STRUCTURE

TECHNICAL FIELD AND INDUSTRIAL APPLICABILITY OF THE INVENTION

The present invention relates to a flexible, multi-layer paperboard structure that may be heat sealed to form a tear resistant packaging material.

BACKGROUND OF THE INVENTION

Use of heat sealable paperboard materials for packaging is described, for example, in U.S. Pat. No. 5,091,261 (Casey et al.). This patent describes a laminate for packaging applications comprised of a paperboard substrate having one coated, printable surface (C1S), and having adhered to the opposing side a co-extrudate of low density polyethylene and an adhesive material, for example, ethylene methylacrylate copolymer. This adhesive material enables the laminate to be used for applications such as the manufacture of blister cards, which requires that a tight seal be formed between the laminate and the plastic material of the blister. In this regard, the adhesive material is a heat sealable component that plasticizes at low heat, so that when opposing surfaces treated with the same material are contacted, the adhesive material bonds together to form a seal.

U.S. Pat. No. 6,010,784 relates to a similar paperboard laminate, where an ethylene-vinyl acetate based hot melt forms the sealant layer, for pharmaceutical blister packaging. The hot melt layer seals to common blister forming films including polychlorotrifluoroethylene (Aclar®), a high barrier film.

The packaging laminates described in U.S. Pat. Nos. 5,091,261 and 6,010,784 exhibit the additional advantage of being clay-coated and thus printable on one side. Accordingly, they are suited to consumer packaging applications, for example, for packaging of unit dose pharmaceuticals. However, these products lacked high tear resistance and burst resistance, which are both characteristics desired for various packaging applications including but not limited to pharmaceutical packaging.

Unit dose packaging is an attractive packaging format for certain pharmaceutical applications because it is convenient, yet sturdy enough to be opened and closed numerous times until the course of medication is completed, and also enables the user to track the consumption of doses according to the prescribed schedule. Examples of such packaging are described in commonly assigned U.S. Pat. No. 6,047,829 (Johnstone). The Johnstone patent relates to a unit dose paperboard package that includes an outer paperboard sleeve, an inner paperboard slide card that is lockably retained within the sleeve. The sleeve includes a plurality of side panels operatively connected to each other such that one of said plurality of side panels includes a first inner slide card releasing means, and another of said side panels includes a second inner slide card releasing means, such that the inner slide card retaining and releasing means are located substantially adjacent to said unit dose dispensing means.

Child resistance is a feature particularly desired for unit dose pharmaceutical packaging, and is mandated by the Poison Prevention Packaging Act of 1970. Guidelines are prescribed for packaging to satisfy the criteria for child resistance under the statute. For example, a child resistance (CR) rating of F=1 requires that a random sampling of the subject packages not be compromised by an age specific test pool of children at a failure rate of greater than 10%. This general guideline is designed to ensure that the package has sufficient integrity against tampering by children.

While modifying package design provides one avenue for improving child resistance, it would also be beneficial to provide similar improved tolerance in packages having a known or more conventional design and construction. In this respect, improving tear resistance is necessarily accomplished by developing packaging materials having such characteristics. At the same time, it is preferred that such packaging material also have a heat sealing ability suited to secure packaging of consumable goods. These objectives are met by the various embodiments of the tear resistant packaging material described and claimed herein.

SUMMARY OF THE INVENTION

The invention is directed to a method of making a laminate formed from a paper or paperboard substrate. An adhesive layer is applied to the substrate. A tear resistant material having a tear strength of about 300 grams force in both the machine and cross direction of the substrate is secured to the substrate by the adhesive. A heat sealing layer is secure to the tear resistant material. The invention is also directed to a method of making a package from the laminate by folding the laminate and securing various regions of the heat seal layer to each other.

DETAILED DESCRIPTION OF THE INVENTION

The invention provides a packaging material that is resistant to tearing or burst damage and thus provides more security to the package contents when it is used, for example, to form a folded box, envelope, blister card or other package. This feature is particularly desirable in the foldover blister packaging of pharmaceuticals where regulatory guidelines specify a certain acceptable level of child resistance. At the same time, the package must be user-friendly, fitted to frequent repeat usage and easily manipulated by the consumer.

The laminated structure of the present invention comprises one or more materials that, in combination, produce the resilience that has now been discovered.

The substrate material may be selected from any conventional paperboard grade, for example solid bleached sulfate (SBS) ranging in weight upward from about 10 pt., preferably from about 11 pt. to about 14 pt. An example of such a substrate is a 12-point SBS board manufactured by Westvaco Corporation. The substrate may also be an unbleached board, depending on the desired appearance of the final package. The board is preferably coated on at least one side, preferably the side opposite the lamination, with a conventional coating selected for compatibility with the printing method and board composition. The coated side would typically be presented on the external surface of the package to allow for printing of text or graphics.

Figure 1:
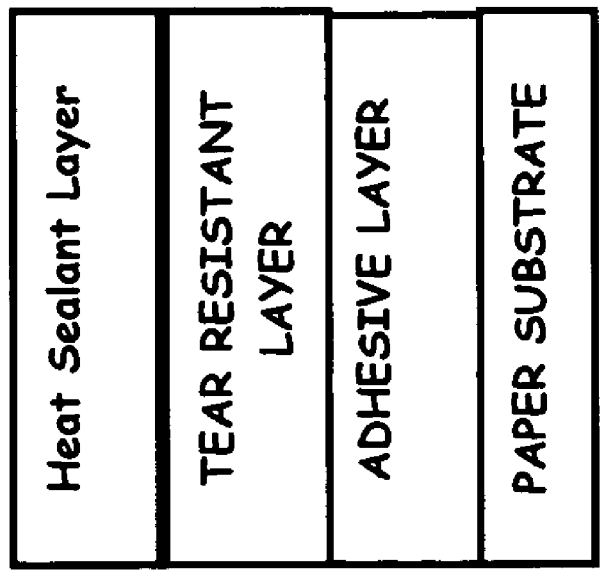
FIG. 1 is a schematic representation of a laminate formed according to the invention.
Figure 2:
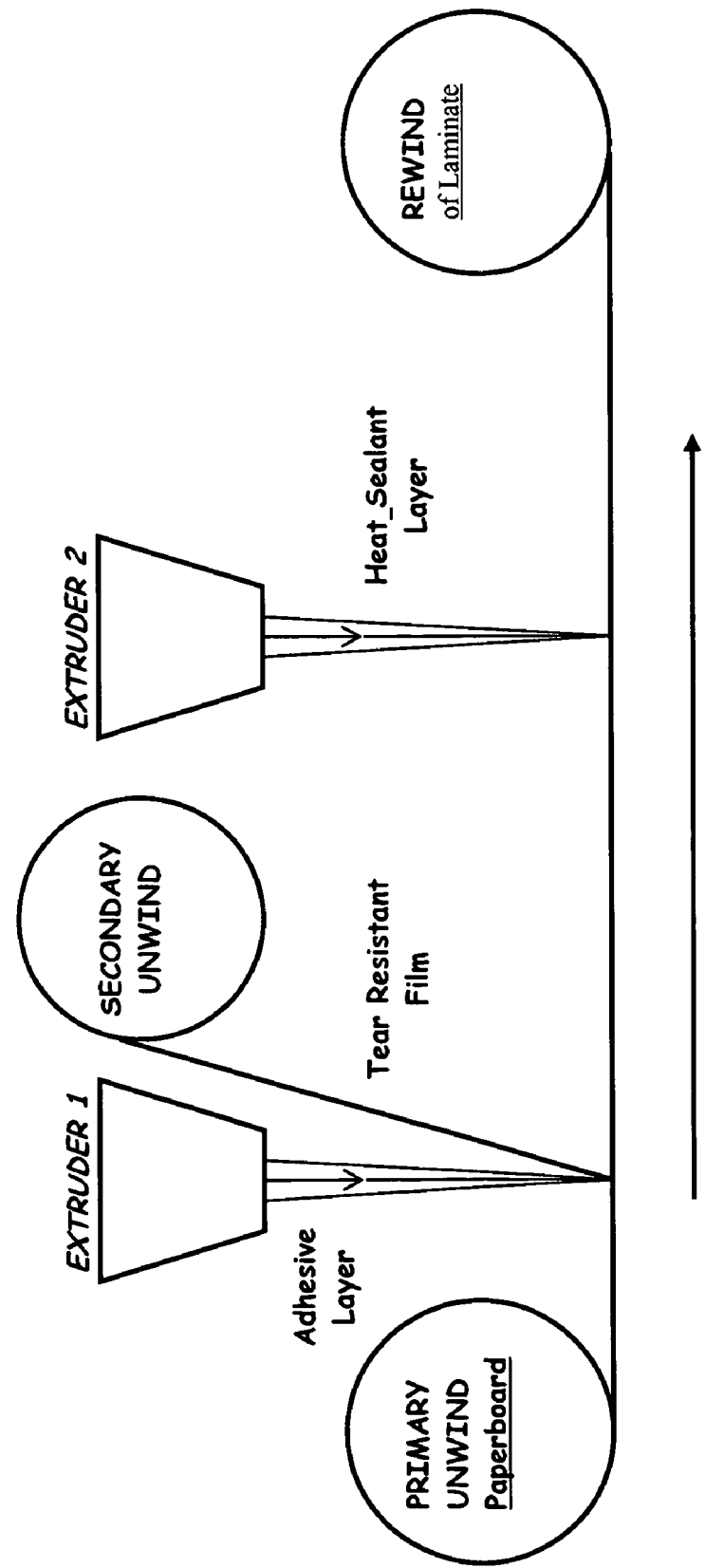
FIG. 2 is a schematic representation of a process for making a laminate according to the invention.

An adhesive layer, such as polyolefin material like low density polyethylene (LDPE) is applied to an uncoated side of the paper or paperboard substrate (FIGS. 1 & 2). A tear resistant layer such as polymeric material is placed in contact with the adhesive layer and thus secured to the paper of paperboard substrate. The tear resistant layer imparts toughness to the laminate structure. Suitable tear resistant materials to include n-axially oriented films, e.g. MYLAR™, which is a biaxially oriented polyester, oriented nylon, e.g. DARTEK™, cross-laminated polyolefin film, e.g. VALERON™ or INTEPLUS™, which are high density polyolefins. The orientation and cross-laminated structure of these materials contribute to the tear resistant characteristic. Also, tear resistance may be attributed to the chemical nature of the tear resistant material such as extruded metallocene-catalyzed polyethylene (mPE).

Figure 3:
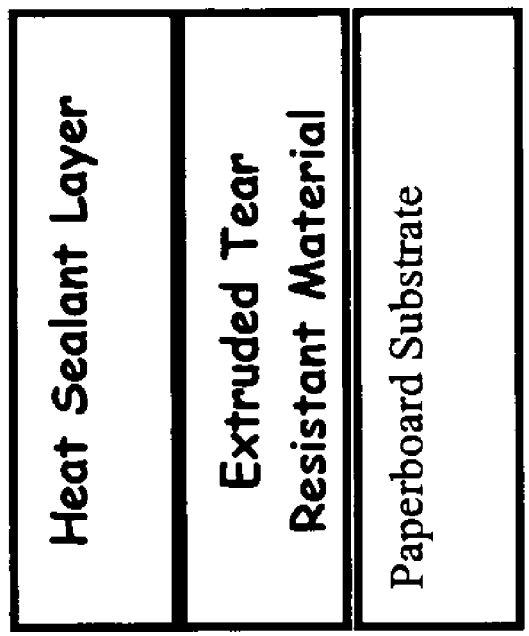
FIG. 3 is a schematic representation of another laminate formed according to the invention.
Figure 4:
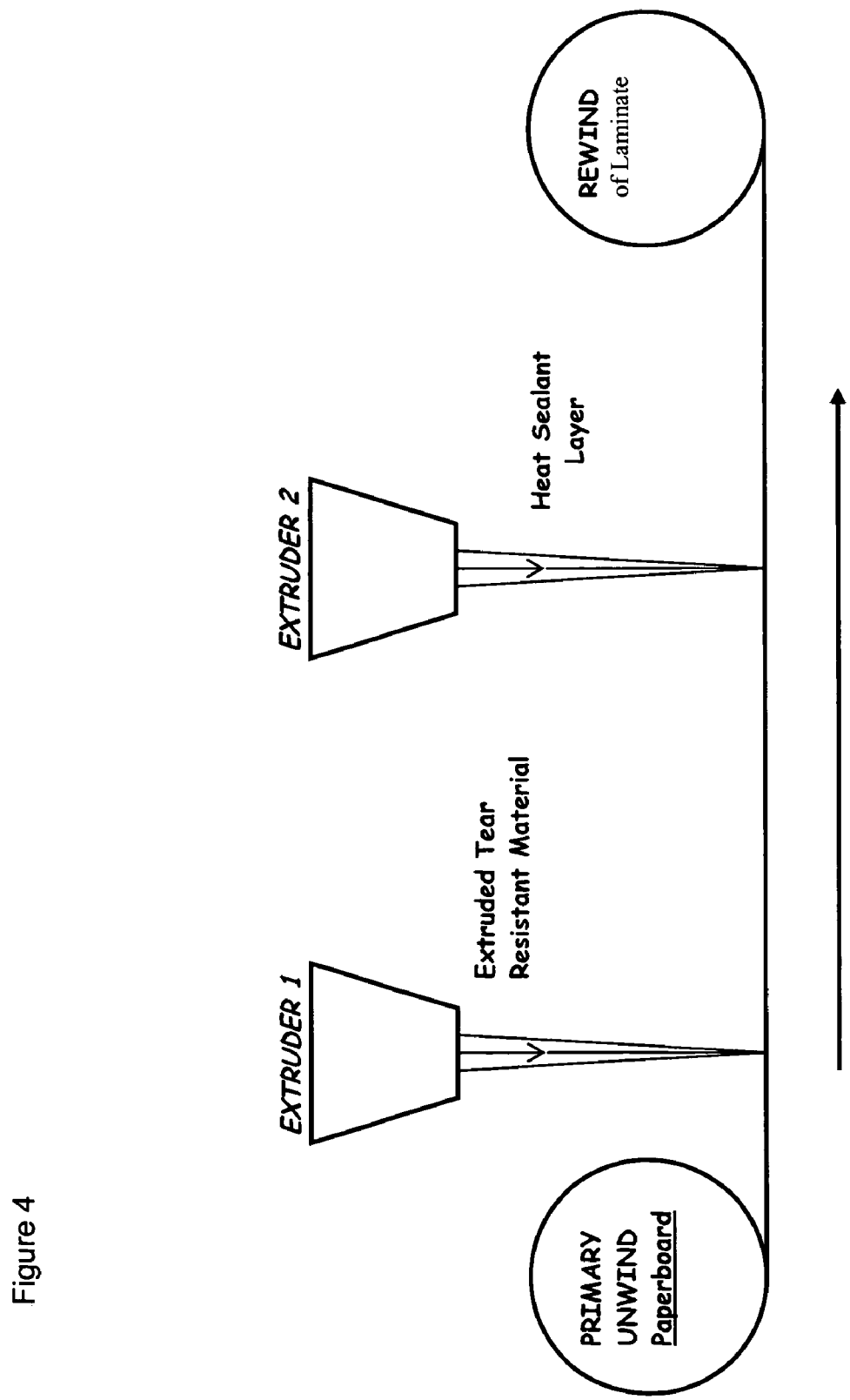
FIG. 4 is a schematic representation of an alternative process for making a laminate according to the invention.

Alternatively, as illustrate in FIG. 3, the tear resistant layer may be an extrusion-coated layer, such as LLDPE or mPE. FIG. 4 illustrates a schematic process for forming this laminate. In embodiments where linear low-density polyethylene (LLDPE) or mPE is used, however, it is not necessary to incorporate the adhesive layer. Other suitable materials having a high level of tear resistance may also be used. It has now been found that various combinations of these materials when applied to a paper or paperboard substrate, such as bleached board substrate, produce improve tear resistance performance.

Where a sheet material such as oriented polyester or nylon or cross-laminated is used as the tear resistant layer, a caliper ranging from about 0.75 mils (approximately 16 lb./ream) or more is preferred. As used herein, ream size≈3000 ft². For example, a suitable caliper of tear resistant material may range from about 0.75 mils or more, preferably from about 1 mil to about 5 mils. In embodiments in which the tear resistant layer is formed from a bulk polymer material that is extruded onto the substrate, the polymer melt is extruded to yield a coat weight of from about 10.8 to about 70 lb./ream, preferably 14 to about 35 lb./ream.

Finally, a heat seal layer may be applied to the tear resistant layer by a process such as melt extrusion, film coating, spraying, roll coating or other means. The heat seal layer serves as convenient means of forming packages from the laminate. When heated, the heat seal layer forms an adhesive when contacted with other regions of the laminate. Examples of suitable heat seal material include ethylene vinyl acetate (EVA), ethylene methyl acrylate (EMA) copolymers, or combinations thereof. Preferably, the heat seal layer is applied by melt extrusion A suitable coat weight is from about 5 pounds per 3,000 square feet to about 14 pounds per 3,000 square feet, preferably about 8 to 10 pounds per 3,000 square feet. The process of FIG. 2 is described in detail in U.S. Pat. No. 5,091,261, the entire disclosure of which is incorporated herein by reference.

In a preferred embodiment of the invention, as shown in FIG. 1, a laminate structure is formed in an in-line operation by unwinding a C1S paperboard substrate, extruding a polymer melt of LDPE to the substrate and securing a tear resistant material onto the polymer melt. A layer of a heat seal material such as a combination of LDPE and ethylene methacrylic acid (EMA), is extruded over the tear resistant material. According to FIG. 2, the sealant layer may be a single component, EVA. Alternatively, as shown in FIG. 3, both the tear resistant layer and the heat seal material may be co-extruded. In such an application, a chemically strengthened material such as mPE, which may be extruded without compromise to its strength characteristics, is used as the tear resistant layer.

The resulting flexible, laminated structure of the invention may be used in any packaging application where tear resistance is required. One of many such applications is the packaging of pharmaceuticals such as prescription medications. In one exemplary application, the laminate may be used to form the outer packaging of a box housing unit dose medications. In such an embodiment, the medications may be housed in individual doses on a blister card that is contained within the box interior. The box blank may be configured and folded to provide a retention means for the blister card, thereby preventing its complete withdrawal from the package interior. Such retention means are disclosed, for example, in U.S. Pat. No. 6,047,829 (Johnstone). In the alternative, the blister card may be unattached so as to allow its complete withdrawal from the package, if desired. Packaging of other articles such as dry or semi-moist foods, cosmetics, small electronics, recording media such as CDs and tapes and various other articles are also contemplated and should be viewed as falling within the scope of this disclosure. The laminate structure of the invention may, however, also be manufactured using a lighter weight paperboard substrate or even a paper, for example, envelope grade material, to manufacture other types of containers such as envelopes or mailers. The range of potential applications is therefore quite extensive for this versatile composition.

EXAMPLES

Example 1

Tear resistance of several extrusion coatable polymers coated onto 61-lb. weight paper substrate were evaluated and reported in Table 1. Tear resistance was determined as grams force in the machine- and cross-directions (MD and CD, respectively). Burst strength was reported in pounds per square inch (psi).

As shown, metallocene-catalyzed polyethylene (mPE) demonstrated significantly greater tear resistance than LDPE, EMA, cross-laminated film (VALERON™), and ionomer (cationically neutralized EMA copolymer, DuPont), when coated onto the substrate.

TABLE 1

Comparison of tear resistant laminates.

| Measurement | Substrate: 61 # paper | Tyvek ™ | 2.5 mil Valeron ™ on 80# paper | 1 mil LDPE on 61# paper | .75 mil EMA on 61# paper | 1 mil ionomer on 61# paper | 1 mil mPE on 61# paper |
|---|---|---|---|---|---|---|---|
| Total Caliper, mils | 5 | 5.9 | 8.8 | 5.8 | 5.5 | 5.8 | 5.7 |
| Basis Weight, lbs/1000 sq. ft. | 17.6 | 11.7 | 41.7 | 22.3 | 21.4 | 23.2 | 23.9 |
| MD Tear, gm-force | 80 | 592 | 511 | 63 | 117 | 97 | 525 |

TABLE 1-continued

Comparison of tear resistant laminates.

| | | | Layer Type: | | | | |
|---|---|---|---|---|---|---|---|
| Measurement | Substrate: 61 # paper | Tyvek ™ | 2.5 mil Valeron ™ on 80# paper | 1 mil LDPE on 61# paper | .75 mil EMA on 61# paper | 1 mil ionomer on 61# paper | 1 mil mPE on 61# paper |
| CD Tear, gm-force | 93 | 622 | 834 | 67 | 121 | 103 | 507 |
| Burst Resistance, psi | 36.8 | 113 | 52 | 40.2 | 37.2 | 37.8 | 35.8 |

Example 2

An example of tear resistant layer material was also evaluated to determine the effect of layer thickness on tear resistance and burst resistance, again by measuring tear and burst resistance as described above. In this example, mPE was used. Coatings were applied at calipers of from about 1 mil to about 5 mils (approximately 14 lb./ream to about 67.2 lb./ream coat weight, respectively). The results are reported in Table 2.

TABLE 2

Effect of increasing mPE coat weight on paper

| | 61 # paper | Tyvek ™ | 2.5 mil Valeron ™ on 80 # paper | Increasing coat weights of mPE on 61# paper | | | | | |
|---|---|---|---|---|---|---|---|---|---|
| | | | | 1 mil | 2 mil | 2.5 mil | 3 mil | 4 mil | 4.8 mil |
| Total Caliper, mils | 5 | 5.9 | 8.8 | 5.7 | 6.7 | 7.1 | 7.5 | 8.7 | 9.5 |
| Basis Weight, lbs/1000 sq. ft. | 17.6 | 11.7 | 41.7 | 23.9 | 28.7 | 30.2 | 31.8 | 38.2 | 41.8 |
| MD Tear, gm-force | 80 | 592 | 511 | 525 | 664 | 734 | 605 | 976 | 1246 |
| CD Tear, gm-force | 93 | 622 | 834 | 507 | 645 | 864 | 750 | 1108 | 1208 |
| Burst Resistance, psi | 36.8 | 113 | 52 | 35.8 | 38.6 | 38.8 | 40.6 | 44 | 46.2 |

Table 2 indicates that mPE coated at a range of thickness from 1 mil upward provides good tear resistance.

Example 2

Laminated structures according to various embodiments of the invention are prepared according to the combinations recited in Table 3.

TABLE 3

| SUBSTRATE | TEAR RESISTANT MATERIAL | HEAT SEAL COMPONENT |
|---|---|---|
| 12 pt. SBS | Metallocene polyethylene | LDPE/EMA coextrusion or EVA monolayer |
| 12 pt. SBS | Oriented polyester | LDPE/EMA coextrusion or EVA monolayer |
| 12 pt. SBS | Cross-laminated film | LDPE/EMA coextrusion or EVA monolayer |

TABLE 3-continued

| SUBSTRATE | TEAR RESISTANT MATERIAL | HEAT SEAL COMPONENT |
|---|---|---|

SBS - bleached sulfate board
EMA - ethylene methyl acrylate copolymer, Optima TC220 (ExxonMobil) or SP 2260 (Eastman Chemical)
EVA - ethylene vinyl acetate copolymer, HL9918X from H. B. Fuller Example 3

The tear resistance of various structures prepared according to the invention was evaluated. Laminates were prepared by layering metallocene-catalyzed polyethylene, 2.5 mils (35 lbs./3000 ft$^2$) or, alternatively, biaxially oriented polyester, 0.75 mils (16 lbs./3000 ft$^2$) on 12 or 14 point SBS paperboard. The heat seal layer (Hot melt HL9918X, from H. B. Fuller) was applied by melt extrusion at a coat weight of about 9 lbs./3000 ft$^2$. Multiple samples of equivalent dimension were subjected to the Elmendorf tear propagation resistance evaluation, the results being measured in grams-force. The samples were also tested using the Graves tear test to determine tear initiation resistance at maximum load. The results are reported in Table 4.

TABLE 4

| SAMPLE | LAMINATE COMPOSITION | CALIPER (Mils) | BASIS WEIGHT (lbs./3000 ft²) | Elmendorf Tear (grams-force) | | Graves Tear (lb/in.) | |
|---|---|---|---|---|---|---|---|
| | | | | MD | CD | MD | CD |
| C | 12 pt. SBS/metallocene-catalyzed PE | 14.71 | 197.97 | 761 | 823 | 29.7 | 20.3 |
| D | 14 pt. SBS/biaxially oriented polyester | 15.84 | 211.20 | 359 | 337 | 37.2 | 29.2 |
| E | 14 pt. SBS/cross-laminated film | 18.32 | 233.97 | 1432 | 807 | 35.0 | 25.9 |

MD—machine direction
CD—cross direction

The tear resistance performance demonstrated in Table 4 indicate that the laminate incorporating metallocene-catalyzed polyethylene has good tear propagation resistance; the laminate incorporating biaxially oriented polyester has good tear initiation resistance; and the laminate incorporating cross-laminated film has excellent overall tear strength, showing both good tear initiation and tear propagation resistance.

We claim:

1. A packaging laminate comprising:
   a paperboard substrate having a coated side and an uncoated side;
   a metallocene-catalyzed polyethylene film layered over said uncoated side; and
   at least one heat sealing layer secured to said film such that said film is positioned between said heat sealing layer and said uncoated side, wherein said heat sealing layer includes at least one of an ethylene vinyl acetate and an ethylene methyl acrylate,
   wherein said laminate has a tear resistance, as measured by the Elmendorf tear propagation test, of about 337 to about 1432 grams-force.

2. The laminate of claim 1 wherein the paperboard substrate is a C1S solid bleached sulfate (SBS) board.

3. The laminate of claim 1 further comprising an adhesive layer applied to said uncoated side, wherein said adhesive layer includes at least one of a low-density polyethylene and a linear low density polyethylene.

4. The laminate of claim 1 wherein said film has a thickness of from about 1 mil up to about 5 mils.

5. The laminate of claim 1 wherein the tear resistant film has a thickness of less than 4 mils.

6. The laminate of claim 4 wherein said film has a thickness of greater than 2 mils and less than about 4 mils.

7. A packaging laminate comprising:
   a paperboard substrate having a coated side and an uncoated side;
   an adhesive layer applied to said uncoated side, wherein said adhesive layer includes at least one of a low-density polyethylene and a linear low density polyethylene;
   a tear resistant film applied to said adhesive layer, wherein said film includes at least one of a metallocene-catalyzed polyethylene, a biaxially oriented polyester and a cross-laminated film; and
   at least one heat sealing layer applied to said tear resistant film such that said tear resistant film is positioned between said heat sealing layer and said adhesive layer, wherein said heat sealing layer includes at least one of an ethylene vinyl acetate and an ethylene methyl acrylate,
   wherein said laminate has a tear resistance, as measured by the Elmendorf tear propagation test, of about 337 to about 1432 grams-force.

8. The laminate of claim 7 wherein said paperboard substrate is a C1S solid bleached sulfate board.

9. The laminate of claim 7 wherein said film has a thickness of about 1 mil to about 5 mils.

* * * * *

UNITED STATES PATENT AND TRADEMARK OFFICE
CERTIFICATE OF CORRECTION

PATENT NO. : 7,144,635 B2
APPLICATION NO. : 09/951035
DATED : December 5, 2006
INVENTOR(S) : David H. Hawes et al.

It is certified that error appears in the above-identified patent and that said Letters Patent is hereby corrected as shown below:

On the title page item (57)

Abstract

Line 1, Change "laminated" to -- laminate --.

Signed and Sealed this

Tenth Day of April, 2007

JON W. DUDAS
*Director of the United States Patent and Trademark Office*